ations the United States Patent (12) United States Patent
Ikeda (10) Patent No.: US 9,358,519 B2
(45) Date of Patent: Jun. 7, 2016

(54) PLASMA GENERATING DEVICE (71) Applicant: IMAGINEERING, Inc., Kobe-shi, Hyogo (JP)

(72) Inventor: Yuji Ikeda, Kobe (JP)

(73) Assignee: IMAGINEERING, INC., Hyogo (JP)

( * ) Notice: Subject to any disclaimer, the term of this patent is extended or adjusted under 35 U.S.C. 154(b) by 0 days.

(21) Appl. No.: 14/369,036

(22) PCT Filed: Dec. 26, 2012

(86) PCT No.: PCT/JP2012/083633
§ 371 (c)(1),
(2) Date: Jul. 25, 2014

(87) PCT Pub. No.: WO2013/099934
PCT Pub. Date: Jul. 4, 2013

(65) Prior Publication Data
US 2015/0010439 A1 Jan. 8, 2015

(30) Foreign Application Priority Data
Dec. 28, 2011 (JP) ................. 2011-289697

(51) Int. Cl.
*B01J 19/08* (2006.01)
*H05H 1/46* (2006.01)
(52) U.S. Cl.
CPC ............. *B01J 19/087* (2013.01); *H05H 1/46* (2013.01); *B01J 2219/085* (2013.01); *B01J 2219/0894* (2013.01); *H05H 2001/463* (2013.01)
(58) Field of Classification Search
CPC ... H05H 1/46; H05H 2001/463; B01J 19/087; B01J 2219/085; B01J 2219/0894; H05B 6/80; H05B 6/705; H01J 37/32192; H01J 37/32256
See application file for complete search history.

(56) References Cited

U.S. PATENT DOCUMENTS

| 8,308,898 | B2 * | 11/2012 | Kasai et al. ............... 156/345.41 |
| 2002/0023896 | A1 * | 2/2002 | Tachino et al. ................. 216/67 |
| 2004/0129220 | A1 | 7/2004 | Saitoh et al. |
| 2012/0285146 | A1 | 11/2012 | Ikeda et al. |

FOREIGN PATENT DOCUMENTS

| EP | 2 478 955 A1 | 7/2012 |
| JP | 11-67114 A | 3/1999 |
| JP | 2005-196980 A | 7/2005 |
| JP | 2009-36199 A | 2/2009 |

* cited by examiner

*Primary Examiner* — Xiuyu Tai
(74) *Attorney, Agent, or Firm* — Westerman, Hattori, Daniels & Adrian, LLP (57) ABSTRACT

The present invention aims to provide a plasma generation device including: a plasma generation part which generates plasma; diluent gas supply means which supplies a diluent gas for diluting the plasma generated by the plasma generation part; and a spray port through which a plasma gas resulting from the dilution of the plasma with the diluent gas is sprayed, in which the characteristics of the plasma gas are changed and controlled so as to enlarge the plasma gas and enhance the activity of the plasma gas, without controlling the power input from a power source to the plasma generation part. The plasma generation device of the present invention includes an electromagnetic wave production device which irradiates at least one of a region where the plasma is generated and a region where the plasma gas passes with an electromagnetic wave from an antenna.

7 Claims, 6 Drawing Sheets

PLASMA GENERATING DEVICE

TECHNICAL FIELD

The present invention relates to a plasma generation device for generating plasma.

BACKGROUND ART

Conventionally, a plasma generation device has been known which includes: a plasma generation part which generates plasma; diluent gas supply means which supplies a diluent gas for diluting the plasma generated by the plasma generation part; and a spray port through which a plasma gas resulting from the dilution of the plasma with the diluent gas is sprayed. Japanese Patent Laid-Open No. 11-67114 describes this type of plasma generation device.

CITATION LIST

Patent Literature

Patent Literature 1
  Japanese Patent Laid-Open No. 11-67114

SUMMARY OF INVENTION

Technical Problem

In this type of plasma generation device, changing and controlling the characteristics of the plasma gas such as enlarging the plasma gas and enhancing the activity of the plasma gas require control of the power input from a power source to the plasma generation part.

The present invention has been made in view of this, and an object of the present invention is to change and control the characteristics of the plasma gas so as to enlarge the plasma gas and enhance the activity of the plasma gas, without controlling the power input from a power source to the plasma generation part.

Solution to Problem

A first invention is a plasma generation device including: a plasma generation part which generates plasma; diluent gas supply means which supplies a diluent gas for diluting the plasma generated by the plasma generation part; and a spray port through which a plasma gas resulting from the dilution of the plasma with the diluent gas is sprayed, wherein the plasma generation device includes an electromagnetic wave production device which irradiates at least one of a region where the plasma is generated and a region where the plasma gas passes with an electromagnetic wave from an antenna.

In the first invention, it is possible to change the characteristics of the plasma gas to be sprayed from the spray port by irradiating at least one of the region where the plasma is generated and the region where the plasma gas passes with an electromagnetic wave from the antenna.

A second invention is the plasma generation device according to the first invention, wherein the spray port is formed in a slit-like shape.

A third invention is the plasma generation device according to the second invention, wherein a strong electric field is moved along the slit-like spray port.

A fourth invention is the plasma generation device according to the third invention, including antenna drive means which moves the antenna of the electromagnetic wave production device along the slit-like spray port, wherein the antenna drive means moves the antenna to move the strong electric field accordingly along the spray port.

In the fourth invention, it is possible to enlarge the region where the plasma gas can come into contact by successively producing the enlarged plasma gas along the slit-like spray port.

A fifth invention is the plasma generation device according to the first or second invention, wherein the electromagnetic wave production device includes a transmission path for transmitting a high-frequency wave, and multiple antennas which radiate the high-frequency wave as an electromagnetic wave into a space; and the transmission path includes a main line, multiple branch lines branching off from the main line, and a distributor which is provided between the multiple branch lines and the main line and which turns on and off the high-frequency wave from the main line to each of the branch lines.

In the fifth invention, the plasma is moved with the branch lines being switched.

A sixth invention is the plasma generation device according to the first or second invention, wherein: the electromagnetic wave production device includes frequency changing means which can change the frequency of the electromagnetic wave emitted from the antenna to multiple predetermined frequencies; the antenna includes a main line and multiple branch lines branching off from the main line; and the lengths of the branch lines are set such that changing the frequency of the electromagnetic wave to a predetermined frequency by the frequency changing means causes the amplitude of the electromagnetic wave to become larger in a certain branch line according to the predetermined frequency.

A seventh invention is the plasma generation device according to the first invention, wherein the spray port is formed as an end opening of a tube.

Advantageous Effects of Invention

In the present invention, it is possible to change the characteristics of a plasma gas to be sprayed from a spray port by irradiating at least one of a region where the plasma is generated and a region where the plasma gas passes with an electromagnetic wave from an antenna.

In the fourth invention, it is possible to enlarge the region where the plasma gas can come into contact by successively producing the enlarged plasma gas along the slit-like spray port.

In the fifth invention, it is possible to move the plasma with the branch lines being switched.

DESCRIPTION OF EMBODIMENTS

In the following, embodiments of the present invention will be described in detail on the basis of the drawings. While the following embodiments are essentially preferable examples, these are not intended to limit the present invention, its applications, or the range of its application.

Embodiment 1

Figure 1:
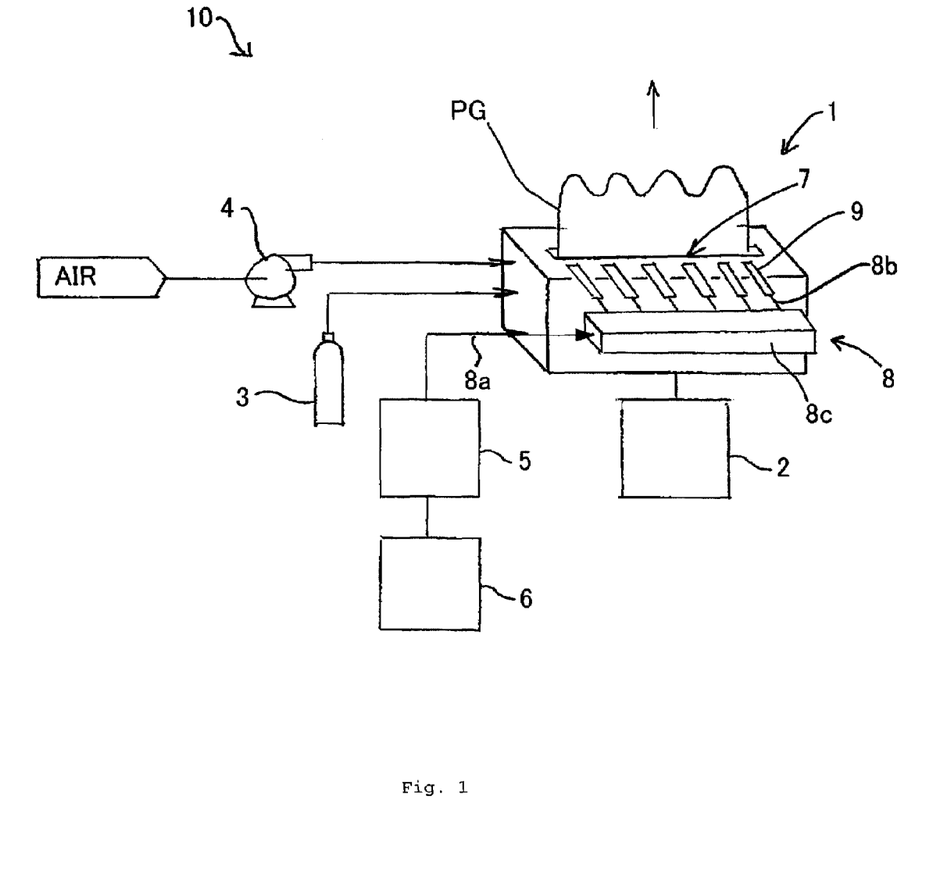
FIG. 1 is a schematic configuration view of a plasma generation device according to Embodiment 1.

In Embodiment 1, plasma generation device 10 includes plasma generation part 1, power source for plasma generation 2, gas cylinder for plasma generation 3, air blower 4 (diluent gas supply means), electromagnetic wave production device 5, and power source for electromagnetic wave production 6, as shown in FIG. 1.

Plasma generation part 1 is constituted of a spark discharger, a corona discharger, a dielectric-barrier discharger, an ICP device, or the like which produces plasma by means of a high-frequency wave.

In order to produce a high-frequency wave for plasma generation, plasma generation part 1 includes a semiconductor transmitter which obtains power from the power source for the plasma generation part and produces a high-frequency wave.

Gas cylinder for plasma generation 3 is a cylinder for supplying plasma generation part 1 with a gas for plasma production which is to be changed into plasma in plasma generation part 1.

In gas cylinder for plasma generation 3, at least one of argon, helium, and neon is stored as the gas for plasma production.

Air blower 4 (diluent gas supply means) is a pressurizing device for supplying plasma generation part 1 with the air with which the generated plasma is diluted to produce plasma gas PG.

The plasma generated in plasma generation part 1 is diluted with the air to form plasma gas PG.

Plasma gas PG is sprayed from spray port 7 provided in the side surface of plasma generation part 1 which is formed in a cuboid shape.

Spray port 7 is formed in a slit-like shape in Embodiment 1.

Electromagnetic wave production device 5 includes a semiconductor transmitter which irradiates plasma gas PG generated in plasma generation part 1 with a microwave, and obtains power from the power source for electromagnetic wave production 6 to produce a microwave.

Electromagnetic wave production device 5 further includes transmission path 8 for transmitting a high-frequency wave from the semiconductor transmitter, and multiple antennas 9 which radiate the electromagnetic wave into a space.

Transmission path 8 includes: main line 8a; multiple branch lines 8b branching off from main line 8a; and distributor 8c which is provided between multiple branch lines 8b and main line 8a and which turns on and off the high-frequency wave from main line 8a to each of branch lines 8b.

Multiple antennas 9 are mounted, one at each of the leading ends of branch lines 8b.

Operation of Plasma Generation Device 1

The operation of plasma generation device 10 will be described. In plasma generation device 10, plasma generation part 1 generates plasma by means of a high-frequency wave in the UHF band.

Electromagnetic wave production device 5 irradiates the base portion of plasma gas PG sprayed from spray port 7, as a region where the plasma gas PG passes, with microwave from antenna 9 and enlarges plasma gas PG.

Enlarged plasma gas PG is gradually moved along the slit with branch lines 8b being switched by distributor 8c.

Effects of Embodiment 1

In Embodiment 1, the characteristics of plasma gas PG can be changed such as enlarging plasma gas PG sprayed from spray port 7, and enhancing the activity of plasma gas PG, by irradiating the region where plasma gas PG passes with a microwave from antenna 9.

Since plasma generation part 1 generates plasma by means of a high-frequency wave in the UHF band, low-temperature stable plasma gas PG can be sprayed.

Since plasma generation part 1 changes at least one of the gases for plasma production, namely, air, argon, helium, and neon into plasma, enlarged plasma is easy to obtain.

In Embodiment 1, since enlarged plasma gas PG is moved along the slit with branch lines 8b being switched by distributor 8c, the area where enlarged plasma gas PG comes into contact can be made larger.

Embodiment 2

Figure 2:
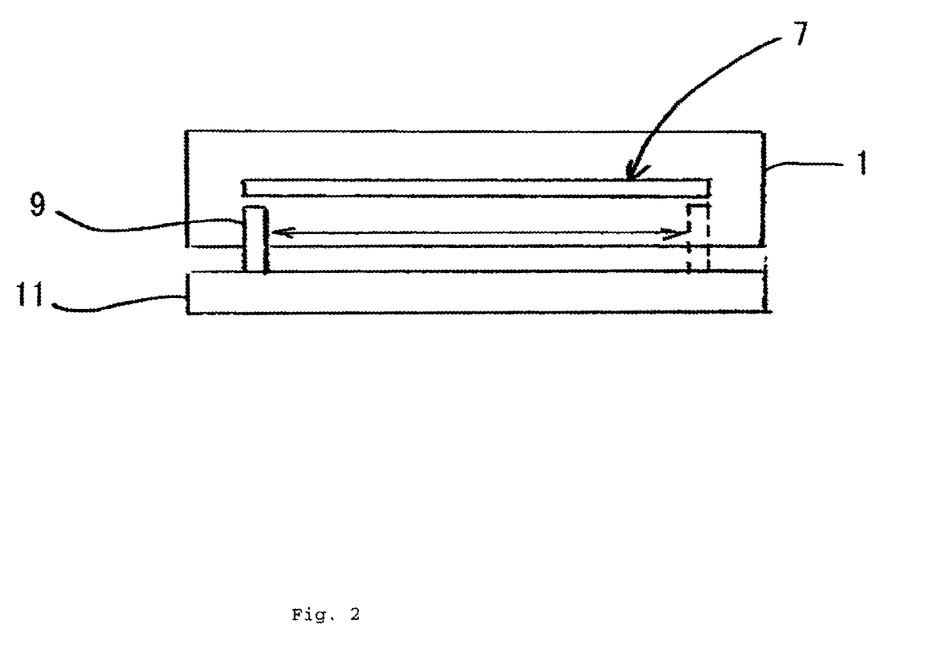
FIG. 2 is a schematic configuration view of a plasma generation device according to Embodiment 2.

In Embodiment 2, as shown in FIG. 2, antenna 9 is mounted on antenna drive means 11 and is disposed so that the leading end of antenna 9 faces the vicinity of spray port 7 on the outside of the main body.

Antenna drive means 11 moves antenna 9 of the electromagnetic wave production device along slit-like spray port 7.

In this way, enlarged plasma gas PG is produced successively along slit-like spray port 7, and can make the area larger where enlarged plasma gas PG comes into contact.

Embodiment 3

Figure 3:
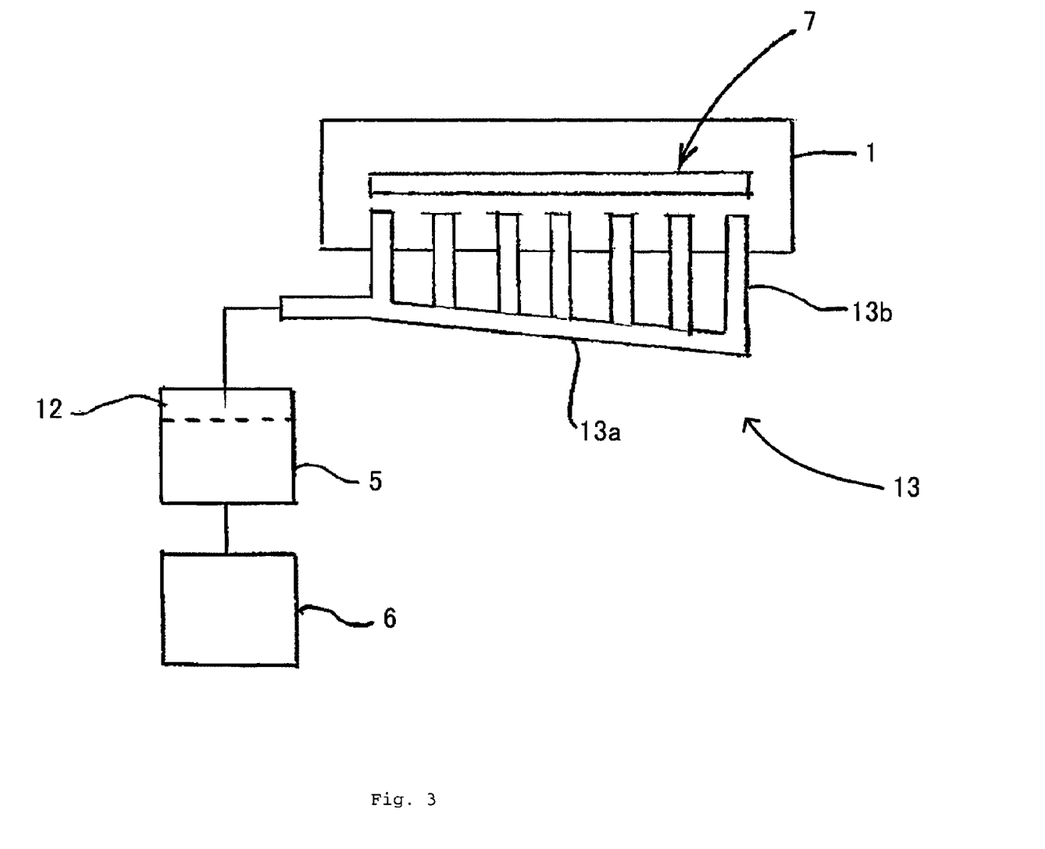
FIG. 3 is a schematic configuration view of a plasma generation device according to Embodiment 3.

In Embodiment 3, as shown in FIG. 3, electromagnetic wave production device 5 includes frequency changing means 12 which can change the frequency of the microwave emitted from antenna 13 to multiple predetermined frequencies.

Antenna 13 includes main line 13a and multiple branch lines 13b branching off from main line 13a.

In branch lines 13b, the lengths of branch lines 13b are set such that the amplitude of the microwave becomes larger so as to correspond to a predetermined frequency in certain branch line 13b.

Therefore, by changing the frequency of the microwave to a predetermined frequency using frequency changing means 12, the amplitude of the microwave can be made larger in certain branch line 13b so as to correspond to the predetermined frequency.

If the amplitude of the microwave can be made larger, plasma gas PG can be enlarged in certain branch line 13b.

Thus, it is possible to move plasma gas PG and enlarge the region where plasma gas PG can come into contact by successively producing enlarged plasma gas PG along slit-like spray port 7.

Embodiment 4

Figure 4:
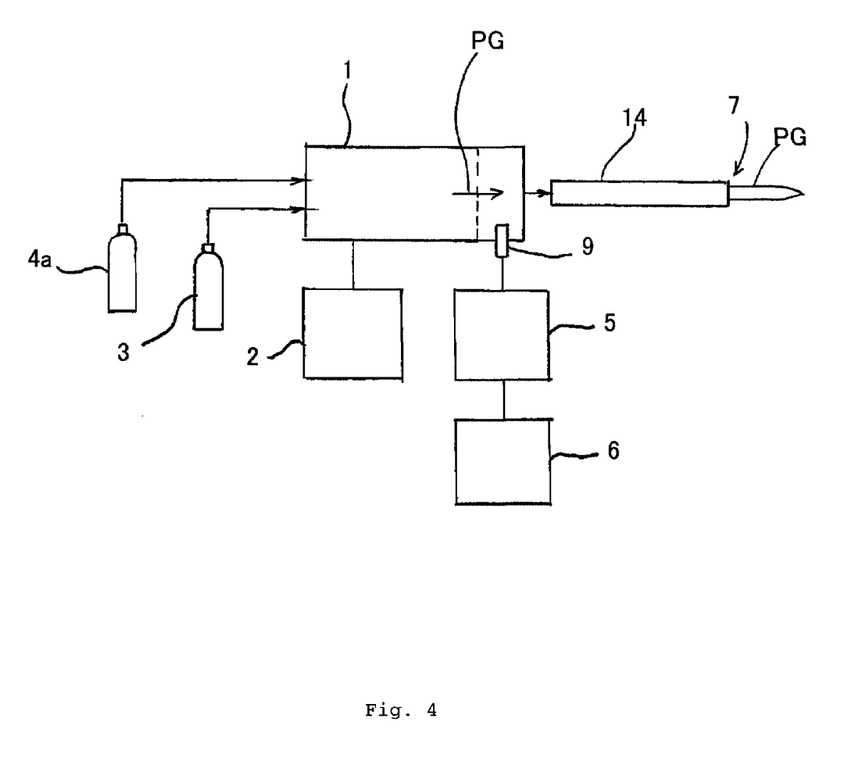
FIG. 4 is a schematic configuration view of a plasma generation device according to Embodiment 4.

In Embodiment 4, as shown in FIG. 4, spray port 7 is formed as an end opening of tube 14.

The diluent gas is supplied from cylinder 4a.

Electromagnetic wave production device 5 is configured to irradiate the region where the plasma gas PG passes following the plasma generation with a microwave from antenna 9.

The characteristics of plasma gas PG to be sprayed from spray port 7 are then changed by irradiating the region where plasma gas PG passes with a microwave from antenna 9.

Other configurations are the same as those of Embodiment 1.

Embodiment 5

Figure 5:
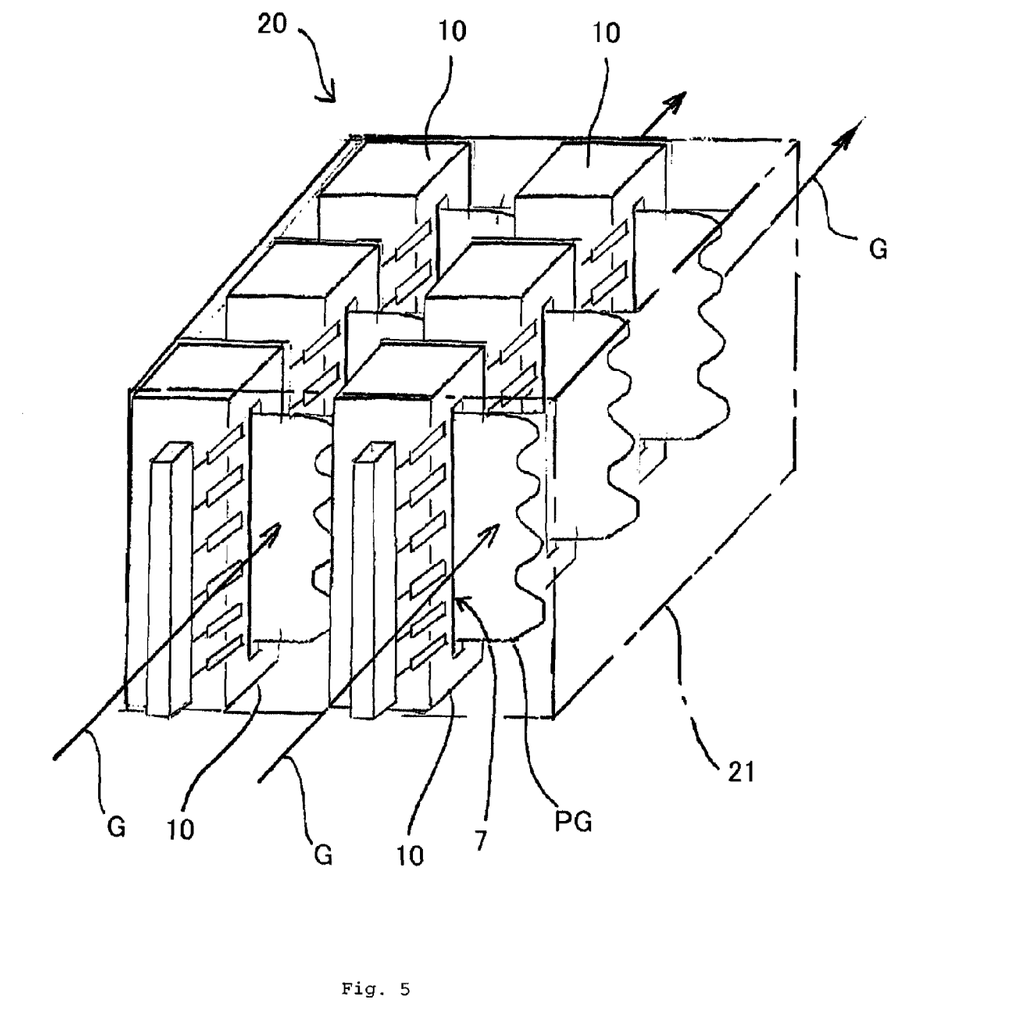
FIG. 5 is a schematic configuration view of an exhaust gas treatment device to which Embodiment 1 is applied.

Plasma generation device 10 of Embodiments 1 to 4 can be used for various applications. For example, Embodiment 5 is an example of applying plasma generation device 10 of Embodiment 1 to exhaust gas treatment device 20, as shown in FIG. 5.

In this exhaust gas treatment device 20, multiple units of plasma generation device 10 of Embodiment 1 are installed in duct 21 of exhaust gas G, and the device is configured such that exhaust gas G passes through the region where plasma gas PG is being generated.

In this exhaust gas treatment device 20, harmful substances in exhaust gas G are rendered harmless by plasma gas PG sprayed from plasma generation device 10.

In addition, impurities contained in exhaust gas G are incinerated by plasma gas PG being sprayed.

According to exhaust gas treatment device 20 of Embodiment 5, the contacting time, the contacting volume, and contactable area of plasma gas PG can be increased by successively producing enlarged plasma gas PG along slit-like spray port 7 and moving plasma gas PG.

Other Embodiments

Plasma generation device 10 of Embodiments 1 to 5 can also be used for target subjects, e.g., blowing off dirt inside an engine by carbonizing or incinerating, using plasma gas PG being sprayed.

It is also possible to use plasma generation device 10 for stanching blood of a living body by plasma gas PG being sprayed.

In plasma generation part 1, turning a gas containing nitrogen atoms and a gas containing oxygen atoms into plasma can produce NO (Nitrogen Oxide) or NO radicals in plasma gas PG to be sprayed. In this case, NO or NO radicals can sterilize a space or an object to which plasma gas PG is sprayed.

Moreover, when the object is a skin of a living body, NO or NO radicals can promote healing of wounds or enhance beauty effects.

Examples Applied to Mist Generation Device 30

Plasma generation device 10 of Embodiments 1 to 5 can also be applied for changing the characteristics of mist.

Figure 6:
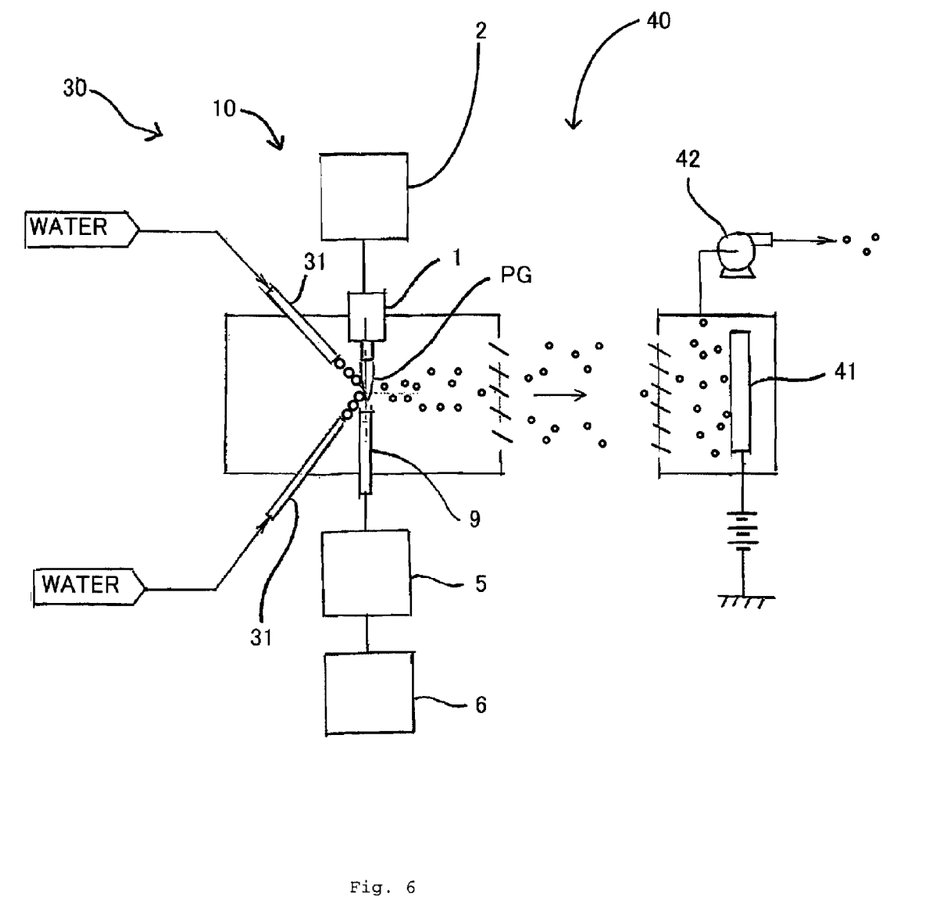
FIG. 6 is a schematic configuration view of a static electricity preventing device to which Embodiment 1 is applied.

For example, FIG. 6 shows an example of applying plasma generation device 10 of Embodiment 1 to mist generation device 30.

Mist generation device 30 includes at least two nozzles 31 each injecting liquid drops by means of pressure, and plasma generation device 10 of Embodiment 1.

Nozzles 31 are arranged so as to bring the liquid drops injected from nozzles 31 into collision with each other. In this way, mists of small particle sizes can be produced.

Plasma generation device 10 is configured to generate a plasma gas in a region where the liquid drops injected from nozzles 31 collide with each other.

Plasma generation device 10 is further configured to irradiate the region where the plasma gas is generated with a microwave from antenna 9 of electromagnetic wave production device 5, and can thereby variously change the characteristics of the mist, such as the particle size.

Thus, it is possible to change the characteristics of liquid drops such as the surface tension, by generating the plasma in the region where the liquid drops are brought into collision with each other and thereby control the characteristics of the mist such as the particle size.

In particular, it is possible to produce dry mist which does not wet clothes or things when attached to them, by making the particle size smaller and the surface tension of the liquid drop larger.

In addition, it is possible to prevent electrification of static electricity in the air by capturing electric charges in the air by this mist particle.

Example Applied to Static Electricity Preventing Device

FIG. 6 also shows mist generation device 30 being used as static electricity preventing device 40.

Static electricity preventing device 40 includes mist generation device 30, electrode 41, and exhaust means 42.

A liquid drop is constituted of a liquid having low evaporability.

Electrode 41 produces an electrical attraction force to the mist particles having captured electric charges in the air.

Exhaust means 42 exhausts the mist particles having captured the electric charges in the air which are gathered around electrode 41.

Thus, it is possible to remove static electricity from the air by gathering the mist particles that captured electric charges in the air to the electrode 41 side. Accordingly, electrification of the static electricity in the air can be prevented.

In particular, since the liquid drop is constituted of a liquid having low evaporability, the liquid drops needs a long time before they are completely evaporated. Accordingly, static electricity in the air can be removed effectively.

INDUSTRIAL APPLICABILITY

As has been described above, the present invention is useful for a plasma generation device which generates plasma.

REFERENCE SIGNS LIST

1 Plasma generation part
4 Diluent gas supply means
5 Electromagnetic wave production device
8 Transmission path
8a Main line
8b Branch line
8c Distributor
9 Antenna
10 Plasma generation device
11 Antenna drive means
12 Frequency changing means

The invention claimed is:

1. A plasma generation device comprising:
a plasma generation part which generates plasma;
an air blower configured to blow air to the plasma generation part as a diluent gas for diluting the plasma generated by the plasma generation part; and
a spray port through which a plasma gas resulting from the dilution of the plasma with the diluent gas is sprayed, wherein
the plasma generation device further comprises an electromagnetic wave production device which irradiates at least one region of (i) a first region where the plasma is generated and (ii) a second region where the plasma gas passes with an electromagnetic wave from an antenna.

2. The plasma generation device according to claim 1, wherein the spray port is formed in a slit-like shape.

3. The plasma generation device according to claim 2, wherein an intense electric field is moved along the slit-like spray port.

4. The plasma generation device according to claim 3, comprising antenna drive means which moves the antenna of the electromagnetic wave production device along the slit-like spray port, wherein
the antenna drive means moves the strong electric field along the spray port by moving the antenna.

5. The plasma generation device according to claim 1, wherein
- the electromagnetic wave production device includes a transmission path for transmitting a high-frequency wave; and a plurality of antennas which radiate the high-frequency wave as an electromagnetic wave into a space, and
- the transmission path includes a main line; a plurality of branch lines branching off from the main line; and a distributor which is provided between the branch lines and the main line and which turns on and off the high-frequency wave from the main line to each of the branch lines.

6. The plasma generation device according to claim 1, wherein
- the electromagnetic wave production device includes frequency changing means which can change the frequency of the electromagnetic wave emitted from the antenna to a plurality of predetermined frequencies,
- the antenna includes a main line and a plurality of branch lines branching off from the main line, and
- the lengths of the branch lines are set such that changing the frequency of the electromagnetic wave to a predetermined frequency by the frequency changing means causes the amplitude of the electromagnetic wave to become larger in a certain branch line according to the predetermined frequency.

7. The plasma generation device according to claim 1, wherein the spray port is formed as an end opening of a tube.

* * * * *